June 13, 1933.  B. F. MULDOON  1,914,150

CHRISTMAS TREE BASE

Filed Aug. 30, 1928

INVENTOR
Bernard F. Muldoon
BY
Gifford & Sewell
his ATTORNEYS

Patented June 13, 1933

1,914,150

UNITED STATES PATENT OFFICE

BERNARD F. MULDOON, OF MOUNTAIN VIEW, NEW JERSEY, ASSIGNOR TO HENRY HYMAN, OF BROOKLYN, NEW YORK

CHRISTMAS TREE BASE.

Application filed August 30, 1928. Serial No. 302,939.

This invention relates to a Christmas tree base that can be cheaply and easily manufactured and is very light in weight. It will accommodate trees of different sizes and maintain the same in an upright position. Also, provision is made for keeping water in the base so as to aid in keeping the tree green.

Figure 1:
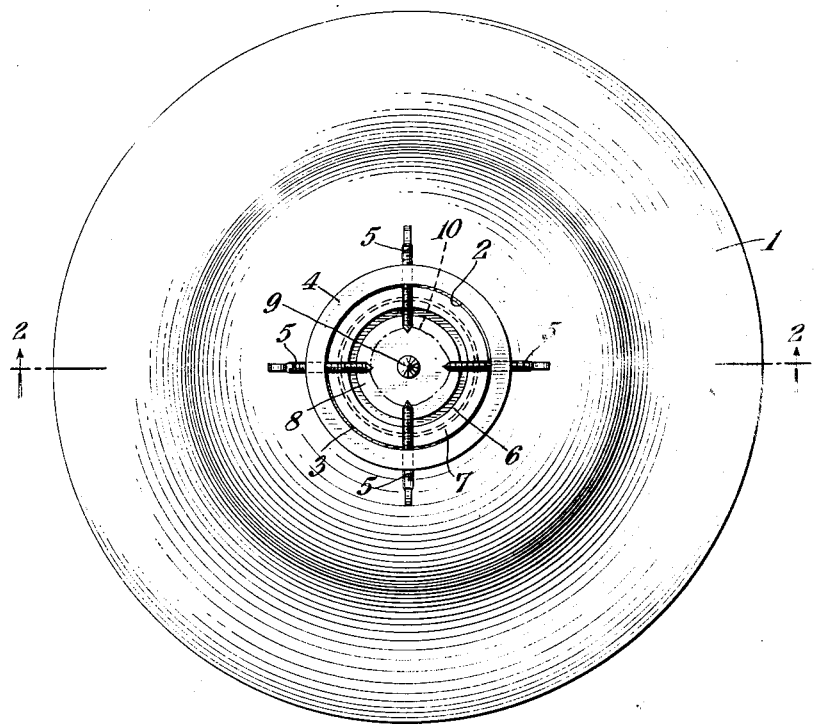
Figure 2:
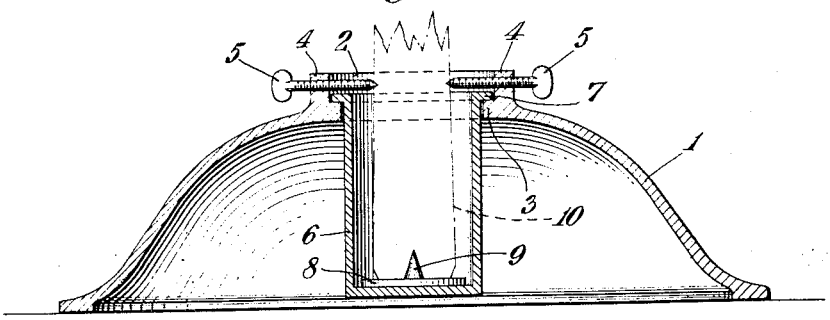

The invention will be understood from the description in connection with the accompanying drawing in which Fig. 1 is a plan view of the device and Fig. 2 is a section along the line 2—2 of Fig. 1.

In the drawing, reference character 1 indicates a dome shaped base or Christmas tree holder that is preferably circular in cross section, with a circular opening at the top thereof. An inwardly extending annular ledge or support 3 is provided in the opening 2, and a circular rib 4 extends upwardly from the ledge 3.

A plurality of thumb screws 5 extends through the rib 4, and a receptacle 6, that may be cylindrical in shape, is provided with an outwardly extending flange 7 that rests upon the ledge 3 when the receptacle 6 is in place.

A disc 8 slightly less in diameter than the receptacle 6 is provided with a sharpened prong 9 at the center.

In using the device the receptacle 6 is inserted through the hole 2 until its flange 7 rests upon the ledge 3. The receptacle 6 may be partially filled with water either before or after it is put in place. The disc 8 is attached to the lower end of the tree 10 by driving the prong into the end, and the tree with the disc 8 at the end thereof is placed in the receptacle in an upright position and the thumb screws 5 are then adjusted to hold the tree securely in position.

An advantage of having the separate disc 8 is that the axis of the tree 10 can be made concentric with the axis of the cylinder 6, so that the tree will be accurately centered even when the tree is of smaller diameter than the receptacle 6.

The base 1 can be made of a sufficient diameter to prevent the tree from toppling over easily and is so shaped that it presents an ornamental appearance. At the same time, the tree can be readily removed from the base or holder.

I claim:

1. A Christmas tree holder comprising a circular base having an open top, a ledge around the opening, a receptacle supported by said ledge, and adjustable screws around the edge of said opening.

2. A Christmas tree holder comprising a dome-shaped base with an opening at the top, a rim around said opening, a ledge inside said rim, a receptacle having a flange on said ledge, and screws passing through said rim sufficient distances from said ledge to accommodate said flange.

BERNARD F. MULDOON.